United States Patent [19]

Wehde

[11] 4,117,359
[45] Sep. 26, 1978

[54] BEARING AND DRIVE STRUCTURE FOR SPINNING TURBINE

[75] Inventor: Heinz Wehde, Rothenberg, Germany

[73] Assignee: Teldix GmbH, Heidelberg, Germany

[21] Appl. No.: 695,551

[22] Filed: Jun. 14, 1976

Related U.S. Application Data

[63] Continuation-in-part of Ser. No. 545,292, Jan. 29, 1975, abandoned.

[30] Foreign Application Priority Data

Jan. 30, 1974 [DE] Fed. Rep. of Germany ....... 2404241

[51] Int. Cl.² .............................................. H02K 7/00
[52] U.S. Cl. ................................... 310/67 R; 310/90; 310/156; 57/77.45
[58] Field of Search ................... 310/67, 90, 156, 266, 310/273, 66, 46, 43; 57/10, 77.45, 58.89; 308/DIG. 15, 237 A, 238; 415/122 R, 122 A

[56] References Cited

U.S. PATENT DOCUMENTS

| | | | |
|---|---|---|---|
| 3,387,153 | 6/1968 | Grad | 310/90 |
| 3,458,740 | 7/1969 | Kaneko | 310/67 |
| 3,462,626 | 8/1969 | Kluss | 310/156 |
| 3,596,121 | 7/1971 | Chang | 310/211 |
| 3,636,392 | 1/1972 | Gerry | 310/156 |
| 3,701,912 | 10/1972 | Schulze | 310/90 |
| 3,875,732 | 4/1975 | Elingham | 57/58.89 |
| 3,958,846 | 5/1976 | Donner | 57/58.89 |
| 3,972,171 | 8/1976 | Handschuch | 57/100 |
| 3,974,406 | 10/1976 | Wehde | 310/156 |

Primary Examiner—R. Skudy
Attorney, Agent, or Firm—Spencer & Kaye

[57] ABSTRACT

A bearing and drive structure for the funnel-shaped spinning element of an open-end spinning turbine, composed of a stator with a projecting portion carrying an elastically mounted bearing and a rotor with a cup-shaped portion into which the projecting portion of the stator extends, the rotor being carried by the bearing and having its center of gravity at least approximately in the region defined between the axial ends of the flexible bearing, the stator carrying electrical windings cooperating with the cup-shaped rotor portion to form an electrical drive for the rotor.

39 Claims, 5 Drawing Figures

BEARING AND DRIVE STRUCTURE FOR SPINNING TURBINE

CROSS-REFERENCE TO RELATED APPLICATION

This application is a continuation-in-part of Application Ser. No. 545,292, filed Jan. 29, 1975 now abandoned.

BACKGROUND OF THE INVENTION

The invention relates to a rotary device such as can be used in yarn spinning frames or turbines.

In the case of rapidly rotating rotors, considerable demands are placed on the bearing of the rotor, which have a decisive effect on its useful life, its functional safety and the speeds which can be achieved. It is known that, at high speeds, even the smallest imbalances of the rotor give rise to considerable forces on the bearing.

In fact, rotors can be balanced extremely well with known means, but the process is costly in the manufacturing/engineering sense and, even then, the remaining residual imbalance limits the upper end of the speed range which can be achieved. Moreover, in the case of spinning frames which operate in accordance with the open-end spinning method, care must be taken that, as a result of the continuous feed of spinning material, i.e., fibers, into the rotor, the imbalance of the rotor continually varies according to the position and size of this material and thus a correspondingly strong bearing is required.

Furthermore, with rapidly rotating rotors, problems can occur at certain speeds, as a result of oscillations, and, at these speeds, bearing loadings can occur which can lead to the destruction of the bearing and thus of the complete device. If devices with rapidly rotating rotors are to be produced in large quantities, then, additionally, low production costs and a structural design which is as simple as possible are to be desired. Moreover, in order to achieve a long useful life of the device, lubrication of the bearing must be ensured.

SUMMARY OF THE INVENTION

It is an object of the invention to avoid or reduce the abovementioned disadvantages and to create a relatively simple, functionally reliable device in which the forces on the bearing are kept as low as possible. It is another object of the invention to provide a device whose structure is such as to allow low cost production and which ensures a full lubrication so as to achieve a long and useful life.

These and other objects according to the invention are achieved by a bearing and drive structure for a funnel-shaped spinning element of an open-end spinning turbine, which includes a stator having a projecting part, a bearing elastically carried by the projecting part of the stator, a rotor carried by the bearing and having its center of gravity located at least approximately in the region between the axial ends of the bearing, the rotor having a cup-shaped part, into which the projecting part of the stator projects and which is connected to the spinning element, and a pin element supported by the bearing and carrying the rotor and the spinning element.

BRIEF DESCRIPTION OF THE DRAWINGS

FIG. 3 is a cross-sectional view taken along the line III—III of FIG. 2.

FIG. 5 is a cross-sectional, detail, disassembled view of one component of the device of FIG. 1, illustrating the arrangement of rotor magnets.

DESCRIPTION OF THE PREFERRED EMBODIMENTS

Figure 1:
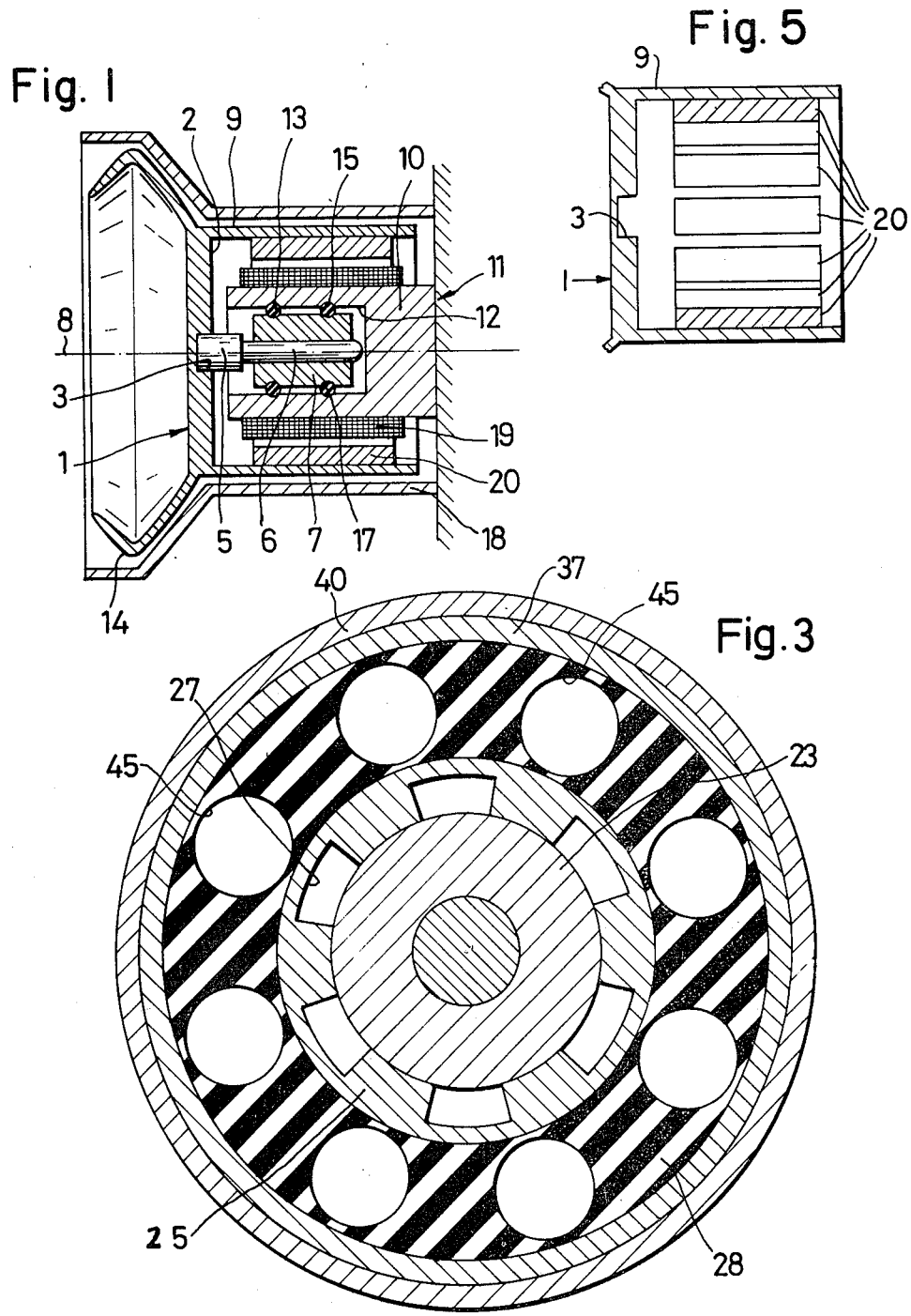
FIG. 1 is a general cross-sectional, side view of a device in accordance with the invention with a cup-shaped rotor.

Basically the invention is directed to bearing and support structures in which the above objects are achieved by mounting the rotor so that it is floatingly supported in relation to the stator by means of a flexibly, or elastically, supported bearing, by having the center of gravity of the rotor located, at least approximately, in the bearing region, by providing the rotor with a preferably cup-shaped part, into which a stator part, containing the bearing, projects, and by constructing the cup-shaped part as well as electrical windings on the stator opposite the cup-shaped rotor part to provide an electrical drive motor.

The device according to the invention is characterized by a relatively simple structure and can be produced without any special excess expenditure of a manufacturing/technical nature. Because of the floating bearing, the rotor rotates in an advantageous manner about the inertia axis of a central principal moment of inertia so that forces at the bearings as a result of imbalances are avoided. By using parts of elastically deformable material, a very effective oscillation damping is also obtained in an advantageous manner.

Because of the at least partially cup- or bell-shaped construction of the rotor, in which the stator or the bearing is arranged, a structurally simple device is created in an advantageous manner in which the center of gravity of the rotor can be located, without difficulty, in the region of the bearing. In other words, the center of gravity is located also in case of imbalances in a radial plane which extends at right angles to the axis of rotation and which traverses the bearing, i.e. this plane is located between the axial extremities of the bearing. The center of gravity is during rotation in addition, - because of the flexible bearing - on the axis of symmetry of the rotor which is approximately the axis of rotation of the rotor. Furthermore, a compact arrangement, particularly in the direction of the rotational axis, is created in an advantageous manner by structurally integrating an electrical drive motor with the rotor and stator. As a result of this axially compact rotor construction, the largest central principal moment of inertia of the rotor is located about its axis of rotation. This construction has the advantage, that a disturbing nutation-frequency does not occur within the range of revolutions with which the rotor rotates.

Thus separate bearings for the rotor and the motor, which are otherwise usual, are unnecessary and the alignment and bearing problems connected become superfluous.

When using the rotor as a spinning element of an open-end spinning frame, or turbine, the rotor has a funnel-shaped element at the front end, which funnel is preferably produced in one piece with the cup-shaped portion of the rotor. Preferably, a ring of elastic material, for example rubber or a conical spiral spring, is arranged between the bearing bush of the journal bearing and the stator, without special manufacturing tolerances having to be maintained as a result.

In a very advantageous embodiment of the invention, the journal bearing, which is constituted by a stationary component supported by the stator, and by the pin element which is rotatably held in an opening provided in the stationary component, is constructed so that the pin element and its associated opening have such a small diameter that, even in the case of high speeds, the relative peripheral speed between the pin element and the bearing bush is comparatively low. Typically, for the common spinning turbine sizes, this diameter is less than 4 mm and preferably between 2 and 3 mm.

According to a further significant feature of the invention, the stationary component is composed of a bearing bush supported by means of a holder in a sleeve. The holder may provide the elastic support for the bush in the stator. The stationary component also includes lubricant reservoirs held in the sleeve. This arrangement permits rapid replacement of the stationary component in the stator. For this purpose, preferably, a screw connection is provided.

If a centrifugal disc is connected to the rotor and, for example, arranged within a lubricant reservoir, the lubricant is forced into a closed circuit course and is prevented from leaving the sleeve. If the reservoirs as well as the holder and bearing bush are arranged within rings, these rings can be very simply incorporated into a sleeve.

By suitable construction of the holder of elastic material surrounding the bearing bush, the stiffness of the arrangement can be adapted to the required operating conditions. Above all, it has proved to be very advantageous to provide bores in the holder since this assists the damping effect thereof. In this way stiffnesses can be achieved which are, above all in the case of mass production, reproducible and lie within allowable tolerances. At the same time, a lubricant interchange through the bores between the reservoirs is made possible. If the reservoirs as well as the holder and bearing bush are arranged within rings, then these rings can be very simply incorporated into a sleeve.

According to a preferred further embodiment, a sealing arrangement is provided between the rotor and the bearing. Such an arrangement may be constructed as a contactless labyrinth seal.

Furthermore, it is proposed to integrate the electrical drive of the rotor with the bearing, in such a manner that permanent magnets are arranged on the inner or outer surface of the cup- or bell-like rotor part, and electrical windings are arranged opposite thereto on the stator. The stator part carrying the windings is produced from an at least approximately electrically nonconductive material and/or a material which causes only slight hysteresis or eddy current losses, presenting an ironless electric motor.

This is of particular importance, since, because of the floating bearing, the rotor can rotate about a central principal axis of inertia, which does not have to coincide with the axis of symmetry of the drive, and the radial forces resulting herefrom, due to the known electrical drives, are avoided to a large extent.

The stator part, which carries the winding may be made of plastic or ceramics.

In addition, it has proved to be very advantageous to surround the rotor on the outside by a housing dimensioned so that a relatively small spacing is provided between the rotor and the housing to reduce the drive losses due to air flow. The spacing between the housing and the rotor may be less than 3 mm for example 2 mm, if the rotor diameter is about 50 mm.

According to a further feature of the invention, the pin element supporting the rotor in the bearing bush is given an axial length such that its free end is located within the region enclosed by a cup-shaped rotor part. This significantly helps to protect the pin, which is preferably very thin, from damage before the rotor is mounted in the stationary bearing component or when the rotor must be removed therefrom.

Referring now to the drawings, as shown in FIG. 1, a rotor 1 is provided with a cup-shaped or bell shaped part 9 which has a bore 3 at the center of its base 2. In the bore 3 a pin 5 is positioned, and the free end 6 of the pin projects into a bearing bush 7. Free end 6 and bush 7 together constitute a journal bearing, the bush being the stationary part of the bearing and end 6 being the rotary part thereof. The center of gravity of the rotor is located at least approximately on its axis of symmetry 8, and in the region of the journal bearing, which includes the bearing bush 7 and the end 6. A part 10 of the stator 11 projects into the cup shaped rotor part 9, and has a bore 12 to accomodate the bearing bush 7. The bearing bush 7 is elastically supported in the bore 12 by means of parts of elastic material which are constructed as O-rings 13. These O-rings lie in annular grooves 15 in the interior surface of the bore 12, as well as in annular grooves 17 in the outer surface of the bearing bush 7. Instead of O-rings, a spiral spring (not shown) can be used, one end of the spring lying preferably against the bore 12 and the other end lying against the bearing bush 7. The portion of pin 5, 6 projecting from base 2 is axially shorter than cup-shaped portion 9 so that the latter will provide protection for the pin when the rotor is removed from the stator.

An electric motor is provided for driving the rotor 1. To this end substantially radially magnetized permanent magnets 20 are positioned on the inner surface of the cup-shaped part 9 of rotor 1. The permanent magnets 20 have an alternating polarity in the peripheral direction and are fastened to the rotor as individual magnets.

FIG. 5 shows the cup-shaped part 9 of rotor 1 in a disassembled state, that is removed from the device of FIG. 1, and with pin 5 removed, to make visible the arrangement of permanent magnets 20 around one-half of the periphery of part 9. Of course, the number of magnets shown in FIG. 5 constitutes only an arbitrarily selected example. Alternatively, for example, they may be formed by metal oxide powder embedded in a suitable plastic material.

Windings 19 are provided on the opposite face of the stator part 10 and are associated with the permanent magnets. A current is caused to flow through the windings so that the rotor is driven, for example, like a brushless direct current motor. The windings 19 are constructed without iron so as to prevent additional forces or moments from being generated which can act on the bearing and which would otherwise be present in an electric motor constructed in this way.

The front end of the rotor (to the left in FIG. 1) is constructed to have a funnel-like form 14, when using this device in spinning frames, or turbines, operating according to the open-end method, the material to be spun is introduced into the funnel-like front end of the rotor and drawn off in a known manner. If, for example, as a result of manufacturing tolerances or of the material located in the funnel 14, the center of gravity of the rotor is not located exactly on the axis of symmetry 8, the rotor can still rotate about its largest central principal axis of inertia adjacent axis 8 because of the floating bearing which is provided as above described. The importance of the construction of the drive motor as an iron-free electric motor is then enhanced in that it also ensures that no additional radial forces or moments are exerted on the bearing even by the drive itself, that is to say, even if the rotor does not rotate exactly about the axis 8. In order to reduce drive losses due to air resistance, which occur particularly at high speeds, the rotor is surrounded on its outside by a stationary housing 18.

Figure 2:
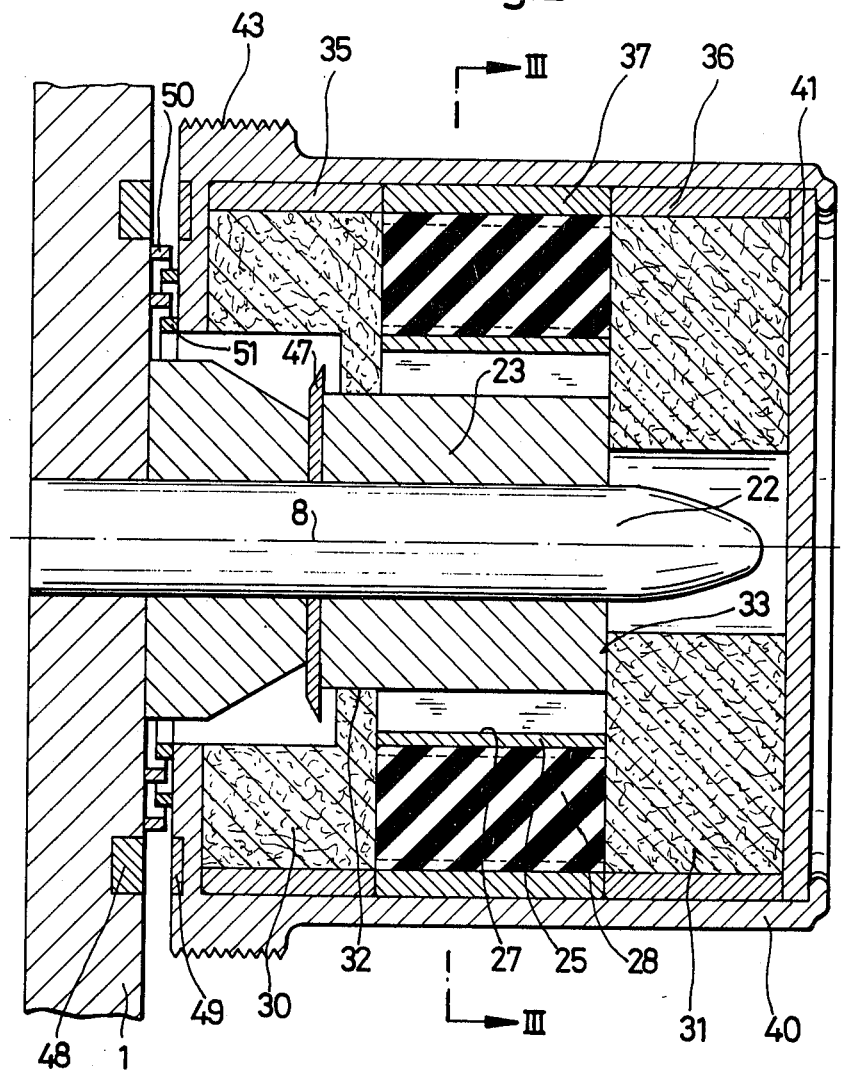
FIG. 2 is a cross-sectional view of the device illustrating a preferred embodiment of a flexible bearing according to the invention.

Referring to FIG. 2, the shaft of the rotor 1 is constructed as a pin 22, which is supported in a bearing bush 23. The bearing bush 23 is made of a porous, preferably sintered material, and is inserted, with a press fit, into a sleeve 25. The sleeve 25 has axially extending grooves 27. The sleeve 25 is surrounded by an annular holder 28 of elastic material which, in turn, is firmly connected to a ring 37. Annularly formed reservoirs 30 31 extend to end faces of the holder 28 and are preferably composed of felt or a similar material. These reservoirs are impregnated with a lubricant. The front reservoir 30 (left hand in FIG. 2) is positioned with one part of its cylindrical inner surface 32 lying on the outer surface of the bearing bush, while the rear reservoir 31 (right hand in FIG. 2) lies with one part 33 of its axial end face against the corresponding axial end of the bearing bush. It should be mentioned that the inner diameter of the rear reservoir 31 is greater than the diameter of the pin 22 in order to avoid frictional losses.

The reservoirs 30 and 31 and the holder 28 are arranged within rings 35, 36 and 37 and are connected thereto, the rings being arranged next to each other in the axial direction and within a sleeve 40. A cover disc 41 is provided at the rear end of the sleeve 40 and is connected to the sleeve by flanging. The bush is furthermore provided with a threaded portion 43 so that it can be fastened in the stator (not shown here), for example in the bore 12 in FIG. 1.

As can be seen from FIG. 3, the elastic holder 28 is provided with peripherally spaced axially extending bores 45. It is possible, by suitable dimensioning and positioning of these bores, to adapt the stiffness or flexibility of the device in a simple manner to the operational requirements of the machine in which it is used. Moreover, a lubricant exchange between the reservoirs 30 and 31 can take place through these bores, which are, for this purpose, preferably provided with a wick or felt arranged therein.

Referring again to FIG. 2, a centrifugal disc 47 is provided on the pin 22 and this disc lies against the front end face of the bearing bush 23 and has an outer diameter which is larger than the outer diameter of the bearing bush. This disc 47, lying against the bearing bush, thus establishes the axial location of the rotor 1, the rotor being axially biased to urge disc 47 against bush 23 by, for example, at least one axially magnetized magnetic ring 48 and a concentric return ring 49, and/or a reduced pressure at the inner side of the rotor.

For sealing purposes, rings 51 are provided at the front end of the sleeve 40 and rings 50 are provided on a facing surface of rotor 1, the rings interleaving without contact and thus forming a labyrinth seal. The spacings or gaps between the rings 50 and 51 are dimensioned so that no contact between the rings will take place even with the maximum possible movement between rotor and stator.

The production, in large numbers, of the device described and particularly with really small dimensions, for example with a bush outer diameter of approximately 15 mm, can be carried out easily because of its construction.

In constructing the device, the reservoirs 30 and 31 are arranged in the rings 35 and 36, and similarly the bearing bush 23, sleeve 25 and the holder 28 are arranged in the ring 37. Subsequently, the constructional groups thus formed are pushed into the sleeve 40. They are fastened in the sleeve by a disc 41 which is retained by flanging over of the sleeve end. The sleeve thus filled forms a complete bearing unit and is ready to be fastened in the stator, for example by means of the threaded portion 43. Finally, the pin 22 of the rotor is to be introduced into the bearing bush 23. If any faults occur in the device described, the bearing unit can be replaced without special expenditure.

The operation of the device is as follows: Bearing bush 23 as well as reservoirs 30 and 31 are impregnated with lubricant during production. For the rotating pin 22, lubricant passes from the bearing bush 23 into the gap between the bearing bush 23 and pin, and also into the gap between disc 47 and bearing bush 23. The lubricant flowing through the first-named gap is conveyed back into the reservoir 31 at the pin end, whereas the lubricant flowing through the other gap is conveyed into the reservoir 30 by way of the disc 47. Since the said reservoirs lie directly on the bearing bush, there will always be enough lubricant in the porous bearing bush to ensure lubrication even for long running times. The grooves cause lubricant to be able to reach the bearing bush from practically all sides. Moreover, the labyrinth seal with the rings 50 and 51 prevents leaking of the lubricant.

Figure 4:
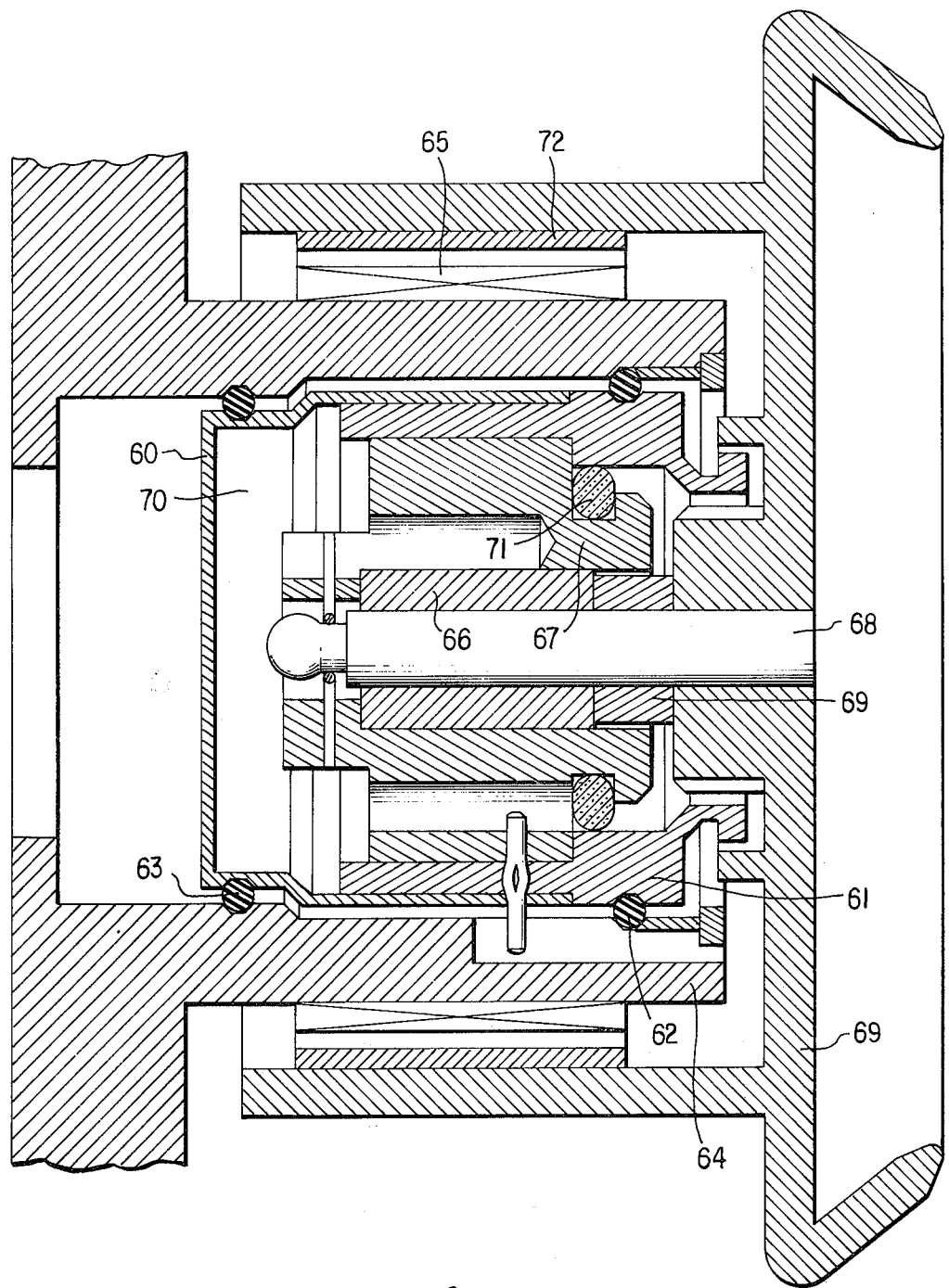
FIG. 4 shows a further embodiment of the invention.

In FIG. 4 also a sleeve 60/61 is provided, which is elastically supported by means of the two O-rings 62 and 63 in the bore of the stator portion 64. On the stator portion there are provided the windings 65. Within the sleeve 60/61 there is provided the bearing bush 66 and a holder 67.

The pin 68 of the rotor 69 is inserted in the bore of the bearing bush and the pin is provided with a ring 69, which together with the one front surface of the bearing bush establishes an axial bearing. Within the sleeve 60/61 there are provided lubricant reservoirs 70 and 71. The magnets on the inner rotor surface are numbered 72.

It will be understood that the above description of the present invention is susceptible to various modifications, changes and adaptations, and the same are intended to be comprehended within the meaning and range of equivalents of the appended claims.

What is claimed is:

1. A bearing and drive structure for a funnel-shaped spinning element of an open-end spinning turbine, comprising:
   a stator having a bearing supporting part;
   a stationary component of a journal bearing including a bearing bush having an opening for receiving a rotary component, and means elastically mounting said bush to said stator bearing supporting part;

a pin element connected to the spinning element and having an end portion constituting the rotary component received in said opening of said bush;

a rotor having a cup-shaped part enclosing said stator part and having a front end to which said spinning element is connected to rotate with said rotor;

electrical windings on said stator cooperating with said rotor to form an electrical drive for rotating said rotor;

said rotor part having an axially compact configuration for causing its largest central principal moment of inertia to be about its axis of rotation;

said journal bearing stationary component being located within the region enclosed by said cup-shaped rotor part; and said rotor part being formed to locate the center of gravity of said rotor in a plane normal to the axis of rotation of said stator and at least approximately located between the axial ends of said journal bearing stationary component.

2. An arrangement as defined in claim 1 wherein said end portion of said pin and said opening of said bush each have a small diameter for establishing a low relative peripheral speed therebetween even when said rotor is rotating at a high rate.

3. An arrangement as defined in claim 2 wherein the diameter of said end portion of said pin is less than 4 mm.

4. An arrangement as defined in claim 3 wherein the diameter of said end portion of said pin is between 2 and 3 mm.

5. An arrangement as defined in claim 1 wherein the free extremity of said pin end portion is located within the region enclosed by said cup shaped rotor part.

6. An arrangement as defined in claim 1 wherein said rotor comprises a plurality of permanent magnets mounted on the interior surface of said cup-shaped rotor part and forming part of said electrical drive.

7. An arrangement as defined in claim 6 wherein there is a number of said magnets disposed to have alternating polarities in the peripheral direction.

8. An arrangement as defined in claim 1, wherein said means elastically mounting said bush comprise parts of elastic material flexible under radially directed forces and moments about axes at right angles to the rotation axis of said bearing.

9. An arrangement as defined in claim 8 wherein said parts of elastic material comprise parts arranged coaxially with said rotation axis of said bearing.

10. An arrangement as defined in claim 1 wherein said means elastically mounting said bush comprise at least one element of elastic material locating said bush in said stator part.

11. An arrangement as defined in claim 10 wherein said bush and said stator part are provided with a plurality of aligned annular grooves and said at least one element of elastic material comprises a plurality of O-rings retained in said grooves.

12. An arrangement as defined in claim 10 wherein said rotor comprises a base defining the bottom of said cup-shaped part and holding said pin element at the end thereof which is opposite said end portion received in said opening of said bush.

13. An arrangement as defined in claim 1 wherein said spinining element and said cup-shaped rotor part are constituted by a one-piece unit.

14. An arrangement as defined in claim 1 wherein said stationary component of said bearing further comprises a sleeve provided with means for permitting interchangeable mounting thereof in said stator part, and means defining at least one lubricant reservoir associated with said bearing bush and positioned in said sleeve; and said means mounting said bush comprise a holder disposed in said sleeve and supporting said bush.

15. An arrangement as defined in claim 14 further comprising a centrifugal disc connected to said rotor for throwing out lubricant for collection by said lubricant reservoir.

16. An arrangement as defined in claim 14 further comprising a disc connected to said rotor defining an axial bearing lying against said bearing bush.

17. An arrangement as defined in claim 16 further comprising at least one axially magnetized magnetic ring and a concentric magnetic return ring associated with said rotor and said stator for urging said rotor against said axial bearing.

18. An arrangement as defined in claim 16 wherein said bearing bush comprises a body of sintered material.

19. An arrangement as defined in claim 14 wherein said holder is made of elastic material and is arranged for fixing said bearing bush in said sleeve.

20. An arrangement as defined in claim 14 wherein said sleeve is elastically mounted in said stator part.

21. An arrangement as defined in claim 14 wherein there are two of said lubricant reservoirs disposed to respectively opposite sides of said bush.

22. An arrangement as defined in claim 21 wherein said holder is provided with opening extending in an axial direction.

23. An arrangement as defined in claim 19 comprising a ring in which the said bearing bush and the said holder are arranged.

24. An arrangement as defined in claim 23 wherein said stationary component of said bearing additionally comprises further rings adjacent to and coaxial with said first-recited ring.

25. An arrangement as defined in claim 20 wherein said sleeve is mounted by means of two O-rings.

26. An arrangement as defined in claim 25 wherein said single element is an injection molded piece.

27. An arrangement as defined in claim 24 wherein said stationary component of said bearing additionally comprises a further sleeve fixedly connected to said holder and in which said bearing bush is press-fitted.

28. An arrangement as defined in claim 27 wherein said bearing bush comprises a body of sintered material.

29. An arrangement as defined in claim 27 wherein said further sleeve is provided with axially extending grooves in its inner surface.

30. An arrangement as defined in claim 14 wherein said stationary component of said bearing further comprises a cover disc fastened at one end of said sleeve, with the other end of said sleeve being open and said pin element projecting out of said open-end of said sleeve.

31. An arrangement as defined in claim 30 wherein said one end of said sleeve is provided with a flange for retaining said cover disc.

32. An arrangement as defined in claim 30 further comprising seal means mounted between said sleeve and said rotor at said open end of said sleeve.

33. An arrangement as defined in claim 32 wherein said seal means comprises a labyrinth seal composed of concentric rings mounted to interleave without contact.

34. An arrangement as defined in claim 1 wherein the portion of said stator carrying said windings comprises a material which is at least approximately electrically non-conductive.

35. An arrangement as defined in claim 1 wherein the portion of said stator carrying said windings comprises a material which causes only slight hysteresis losses.

36. An arrangement as defined in claim 1 wherein the portion of said stator carrying said windings comprises a material which is at least approximately electrically non-conductive and which causes only slight hysteresis losses.

37. An arrangement as defined in claim 1 further comprising a housing surrounding the outside of said rotor and dimensioned to provide a relatively small spacing between the outer surface of said rotor and the inner surface of said housing for reducing drive losses due to air flow.

38. An arrangement as defined in claim 1 wherein the portion of said stator carrying said windings comprises a material which causes only slight eddy current losses.

39. An arrangement as defined in claim 1 wherein the portion of said stator carrying said windings comprises a material which is at least approximately electrically non-conductive and which causes only slight eddy current losses.

* * * * *